United States Patent [19]

Baumgarten

[11] Patent Number: 5,267,787
[45] Date of Patent: Dec. 7, 1993

[54] SCREW EXTRUDER WITH FEED ROLLER

[75] Inventor: Wilfried Baumgarten, Pattensen, Fed. Rep. of Germany

[73] Assignee: Paul Troester Maschinenfabrik, Hanover, Fed. Rep. of Germany

[21] Appl. No.: 47,031

[22] Filed: Apr. 12, 1993

Related U.S. Application Data

[63] Continuation of Ser. No. 800,168, Nov. 27, 1991, abandoned.

Foreign Application Priority Data

Dec. 1, 1990 [DE] Fed. Rep. of Germany ....... 4038365

[51] Int. Cl.$^5$ .............................................. B28C 7/04
[52] U.S. Cl. ...................... 366/76; 366/309; 15/256.51
[58] Field of Search ............. 15/256.51, 71; 366/73, 366/76, 309; 100/102, 174; 355/299; 101/169; 68/270

[56] References Cited

U.S. PATENT DOCUMENTS

| | | | |
|---|---|---|---|
| 2,477,339 | 7/1949 | Ljungquist | 15/256.51 |
| 3,596,635 | 8/1971 | Smitzer | 118/651 |
| 3,847,480 | 11/1974 | Fisher | 100/174 |
| 3,848,993 | 11/1974 | Hasiotis | 100/174 |
| 4,141,112 | 2/1979 | Klemz | 15/256.51 |
| 4,498,760 | 2/1985 | Sugiyama | 355/299 |
| 4,561,766 | 12/1985 | Fox | 15/256.51 |
| 5,081,504 | 1/1992 | Morisawa | 15/256.51 |

*Primary Examiner*—Harvey C. Hornsby
*Assistant Examiner*—Randall E. Chin
*Attorney, Agent, or Firm*—Robert E. Burns; Emmanuel J. Lobato

[57] ABSTRACT

A screw extruder has a feed roller which is parallel to and spaced laterally from the screw, a hopper feeds the material to be extruded to the screw and feed roller and to the space between them. A knife scrapes material from the feed roller to keep it clear. In one embodiment, the knife is pivotally supported by a knife holder disposed below the feed roller and is pulled against the feed roller by a spring-loaded link which is pivotally attached to a median portion of the blade. In another embodiment, the knife is a flexible spring blade. A protuberance on a knife-holding plate limits flexing of the blade by pressure of material in the space between the screw and the feed roller. In a further embodiment, a photo-cell scans a rear side of the feed roller and controls a servo-motor for drawing the knife against the feed roller.

8 Claims, 4 Drawing Sheets

SCREW EXTRUDER WITH FEED ROLLER

This is a continuation of application Ser. No. 07/800,168, filed Nov. 27, 1991, now abandoned.

FIELD OF INVENTION

The invention relates to a screw extruder in the feed hopper of which there is arranged a feed roller on the circumference of which lies the cutting edge of a knife which is pressed against the surface of the feed roller by the force of a spring.

BACKGROUND OF THE INVENTION

In screw extruders for processing rubber mixtures, feed rollers have been used to facilitate the feeding of the rubber mixture to the extruder screw. However, their use has always been problematic because of the danger of the mixture being forced into the sealing spaces, bearings and drive of the feed roller. If the feed roller is not thoroughly and regularly cleaned, in particular during interruptions in operation of the extruder, the pressed-in parts of the mixture become hardened or vulcanized and block the feed roller when operation of the machine is resumed and this frequently leads to serious damage.

Despite these problems, feed rollers have been adopted as standard, in particular for recently developed screw extruders for cold feeding of rubber mixtures, because they effect a partial plasticizing of hard viscous rubber mixtures, which is considered very important. Extruders for processing silicone without feed rollers are unthinkable.

For the above mentioned reasons, the sealing of the feed roller in its mounting in the extruder is highly important, in particular on account of the unavoidable phenomenon of wear during operation. An essential point in this connection is the continual cleaning of the feed roller with the help of a scraping knife which is usually adjustable. In particular with cold working screw extruders, there are large forces created by the plasticizing work between the screw and the feed roller which are sufficient elastically to bend the roller cyclicly during operation. This elastic deformation produces cyclicly an insufficient pressing force of the scraping knife or a minute gap between the surface of the feed roller and the stationary scraping knife through which there is formed on the roller a deposit which, because of the high temperature of the roller, is quickly vulcanized. This can be a very serious disadvantage and must be avoided.

A frequently used cooling of the feed roller, which is necessary for thermic reasons for particular rubber mixtures, does not solve the problem of the danger of vulcanization of material adhering to the feed roller.

As U.S. Pat. No. 1,422,561 shows, it has already been attempted in 1920 to attain continual cleaning of the feed roller surface through spring pressing of the scraping knife with a constant pressing force. For this it is assumed that the scraping knife remains easily movable during the operation which, because of the rubber mixture being pressed into the smallest space, cannot be assured. Also essentially stronger springs are not sufficient to guarantee movement and have also the disadvantage that the strong pressing of the scraping knife against the feed roller results in friction and wear of the knife and/or roller. The same is true for strong pressing of the scraping knife through pneumatic, hydraulic or electrically generated force.

As DE-PS 39 24 734 shows, it was attempted to solve the scraping knife sealing problem by applying a constant pressing force to the scraping knife. There was provided a very expensive force measuring system on the feed roller bearings with which the constantly changing loading of the feed roller by the strip or granular infeed between the screw and the feed roller mantle in the feeding region is measured. According to this variable loading, the pressing force is held constant. Also here it is assumed that the scraping knife is easily movable i.e. is not blocked by fouling or through vulcanization of the rubber mixture. This is achieved in short laboratory test but not in actual practice. Thus the actual problem of cleaning the feed roller is not solved by applying a constant pressing force to the scraping knife. When the feed roller is elastically deflected by reason of high mass pressure, the pressing force exerted on the scraping knife must be greater than when no, or only limited, pressure is exerted on the feed roller. Hence a constant pressing force which is oriented to the highest sealing load of the knife is very objectionable in the sense of avoiding abrasion. This construction is hence not only very expensive but also not practically meaningful.

A scraping knife construction which is not based on the premise of easy movability for a constant pressing of the scraping knife on the roller is disclosed in U.S. Pat. No. 2,537,395. Here the knife is not arranged at an angle but is substantially tangential to the feed roller. This construction stems from a time when cold feeding with the resultant high forces on the feed roller was not yet known. With warm feeding of the extruder, which was usual at that time, the extruder was exclusively fed with prewarmed rubber mixture which exerted only limited forces between the screw and the feed roller. The roller served only to assist in feeding and not, on the contrary, for preplasticizing the mixture. The knife construction and arrangement was hence fully rigid as an elastic deformation of the roller was practically not existent and hence a scraping knife set in optimal position prior to putting the extruder into operation satisfied the requirements of that time.

SUMMARY OF THE INVENTION

The invention eliminates the disadvantages of the state of the art. It is the object of the invention to provide an extremely simple and yet highly effective scraping knife construction and arrangement which, with minimal knife and feed roller abrasion, by means of an extremely limited variable and not excessive pressing force, assures optimal sealing and cleaning of the feed roller surface.

The invention consists therein that the scraping knife is movable in its angle of incidence to the feed roller.

With this very simple arrangement, the high expense of measuring and control techniques are avoided. The outstanding efficiency of scraping is achieved through a special arrangement of the scraping knife, mainly through tilting or elastic deformation of the knife such that this flexibility cannot be hindered through the pressing of the rubber mixture into a gap between the knife and roller.

In one embodiment of the invention the knife is per se rigid, is pivotally supported at its back in a pivot bearing and has its edge drawn into contact with the circumference of the feed roller by a spring.

In another embodiment the knife is a flexible spring.

In accordance with the invention, this is achieved, for example, through an extremely thin scraping knife which is arranged approximately tangential to the feed roller. With this arrangement, any undesired escaping material can fall free to the outside or, as is known per se, can be transmitted back to the extruder hopper by a simple conveyor before it can adhere and build-up, or be vulcanized, on the feed roller. Moreover in accordance with the invention, a scraping knife of this kind can be of simple construction with constant no-load pressing force, which can be adjustable so as to apply the minimal force required for scraping the adhering rubber film from the feeder roller. This is achieved through an adjustable and spring loading of the thin scraping knife, preferably also through an elastic deformation of the thin elastic scraping knife. Thereby, in accordance with the invention, the mass pressure between the screw and the feed roller resulting from the infeeding of the material is applied to the scraping knife in addition to the minimal pressure so that the pressing force of the scraping knife varies in accordance with the loading. It is thereby achieved that there is always optimal knife pressure and scraping action, while in no-load conditions there is limited pressure on the scraping knife and excessive abrasion of the knife and the roller is avoided.

In a further embodiment of the invention the pressing force on the scraping knife can be optimized by an automatic applied force regulating device comprising a sensor and a per se known adjusting device for the force applied to the knife. The sensor will thereby determine whether the circumferential surface of the feed roller is clean, thus is blank, or whether there is a thin layer of rubber adhering to the surface. As the rubber mixture is usually black, or occasionally also colored, it is possible to use as a sensor a photo cell which receives light waves reflected from the circumferential surface of the feed roller. With an optimally selected and adjusted sensor, it is also possible to receive an impulse with white rubber mixtures which can increase the knife pressing force in small steps until the roller is scraped clean and thus is blank. In like manner, through a reversing device, the knife pressure can be reduced, with a mixture change, so that knife pressure varies in accordance with the adhesiveness of the mixture. In this manner the minimum pressing force of the pressing knife is constantly and automatically optimized.

BRIEF DESCRIPTION OF DRAWINGS

The essence of the invention will further appear from the following description of preferred embodiments shown schematically in the accompanying drawings in which.

DESCRIPTION OF PRIOR ART EMBODIMENTS

Figure 1:
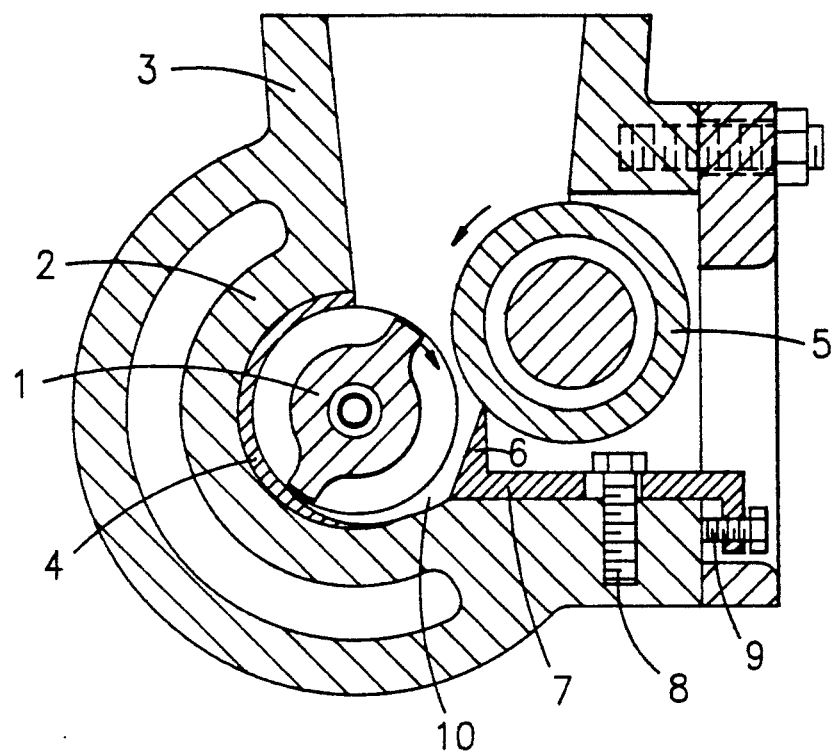
FIG. 1 is a schematic cross sectional view of a prior art screw extruder having a scraping knife on a feed roller.
Figure 2:
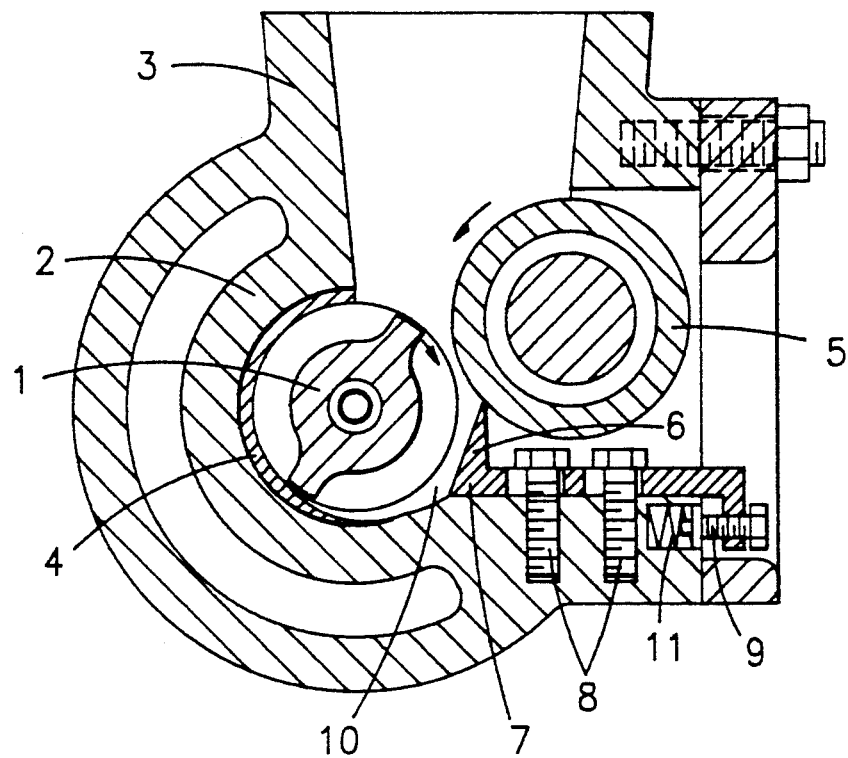
FIG. 2 is a cross sectional view of a further prior art construction.

In FIGS. 1 and 2 cross sections through extruder-feed hopper arrangements of the prior art are shown. In the housing 2 receiving the screw 1 there is formed a hopper 3 for the material to be fed to the extruder. The screw 1 is surrounded, on a portion of its circumference, by an abrasion protection bushing 4 which is fixed in the housing 2. In the housing 2, below the hopper 3 there is mounted a feed roller. In spite of fixed bearings (not shown), a limited elastic deformation of the roller is unavoidable because of the high forces applied to it by the material being processed. This feed roller has, in most cases, a cooling arrangement. In the state of the art, material adhering to the circumferential surface of the feed roller 5 is removed by a rigid scraping knife 6. This scraping knife is frequently made integral with a holder 7, which is secured in the housing 2 by means of a fastening screw 8 and is adjustable by means of an adjusting screw 9. The directions of rotations of the screw and the feed roller are indicated by arrows. Behind the gap between the screw 1 and feed roller 5, directly behind the scraping knife 6 and in front of the abrasion protection bushing 4, there is a pocket 10 which blends spirally into the bushing. In this region, there occurs a very strong working and plastification of the drawn-in material which results in a considerable pressure build-up in this pocket, which acts on the feed roller and also on the side face of the scraping knife 6. Under the pressure which is built up here, the feed roller 5 is elastically pressed away from the screw 1. If the rigid knife 6 which is integral with the rigid mounting 7 as shown in FIG. 1, is not deflected, there occurs a gap between the scraping knife 6 and the feed roller 5 which can permit a built-up of a skin of material on the feed roller 5. When, as shown in FIG. 2, the knife holder 7 is elastically slidable against the force of a spring 11, the knife is pressed against the surface of the feed roller. A build-up of a skin of material on the feed roller is highly undesirable.

DESCRIPTION OF PREFERRED EMBODIMENTS OF INVENTION

Through the present invention, the build-up of such a skin of material on the feed roller 5 is prevented.

Figure 3:
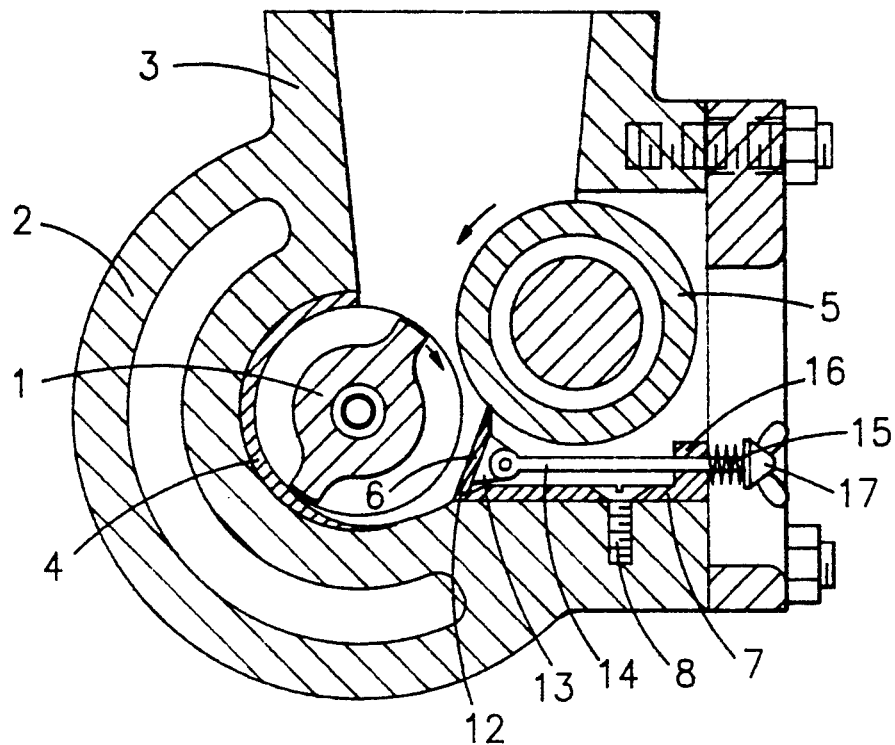
FIG. 3 is a schematic cross sectional view of an extruder in accordance with the present invention.

In the embodiment shown in FIG. 3, the knife holder 7 is rigidly mounted by means of a screw 8. On the end turned toward the screw 1, the knife holder 7 is provided with a bearing seat 12 for a rigid scraping knife 6 having an upper knife edge bearing on the feed roller and a lower back edge lying in this bearing seat 12 to provide a pivotal mounting of the scraping knife. On the back side face turned away from the screw 1, the scraping knife 6 has a pivotal mounting 13 for a link 14 which draws the knife edge of the scraping knife 6 against the circumferential surface of the feed roller 5. The link 14 extends through an opening in an up-standing flange 16 on the end of the knife holder 7 turned away from the screw 1. A coil spring 15 surrounds an outer end portion of the link 14 beyond the flange 16, and is compressed by a nut 17 which is screwed on a threaded end portion of the link 14. By means of the nut 17, the spring force for drawing the pivoted scraping knife toward the feed roller 5 can be varied.

Figure 4:
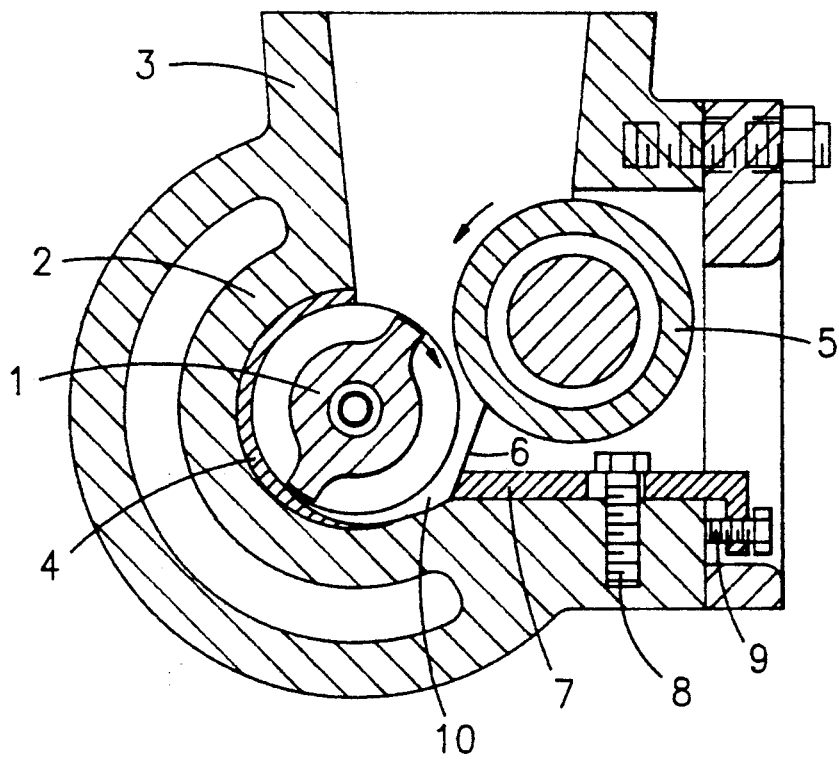
FIG. 4 is a schematic cross sectional view of another embodiment of the invention.

In the embodiment illustrated in FIG. 4, the knife 6 is in itself a thin flexible spring blade which is mounted fast on the inner end of the knife holder 7. The knife holder 7 has an elongated opening through which the mounting screw 8 extends so that the knife holder 7 can be moved outwardly by an adjusting screw 9 to press the flexible knife 6 against the feed roller 5. As the knife 6 is formed of elastic spring steel, it is pressed against the feed roller 5 by the pressure of the mass in the pocket 10. If the pressure of the mass in the pocket 10 becomes greater, the knife is pressed with greater force against the circumferential surface of the feed roller. Hence, even if the feed roller is deflected by the pressure against it, there is assured a good contact of the scraping knife with the circumferential surface of the feed roller.

Figure 5:
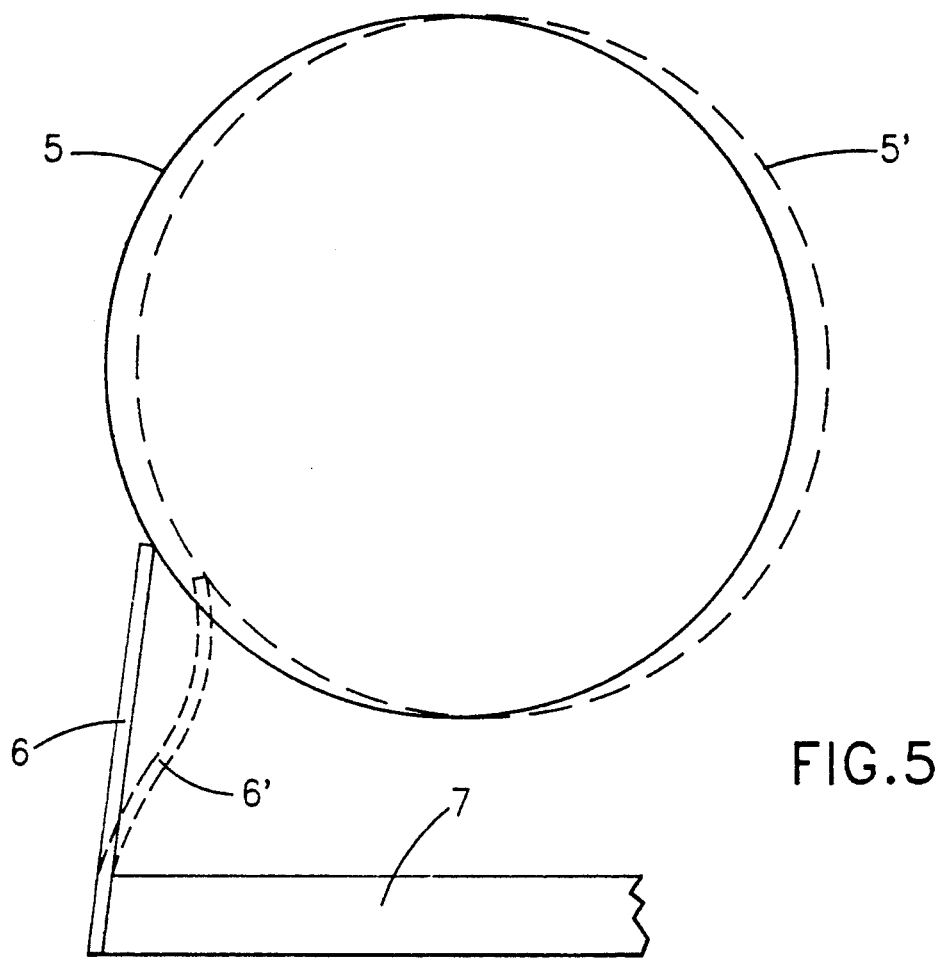
FIG. 5 is a schematic view showing, in solid lines, a feed roller and flexible scraping knife with light loading and, in dotted lines, the feed roller and flexible scraping knife under heavy loading.

FIG. 5 shows schematically, in solid lines, the position of the knife 6 and feed roller 5 with limited loading, i.e. limited pressure in the pocket 10 while dotted lines show the position of the knife 6 and the feed roller 5 with heavy loading.

Figure 6:
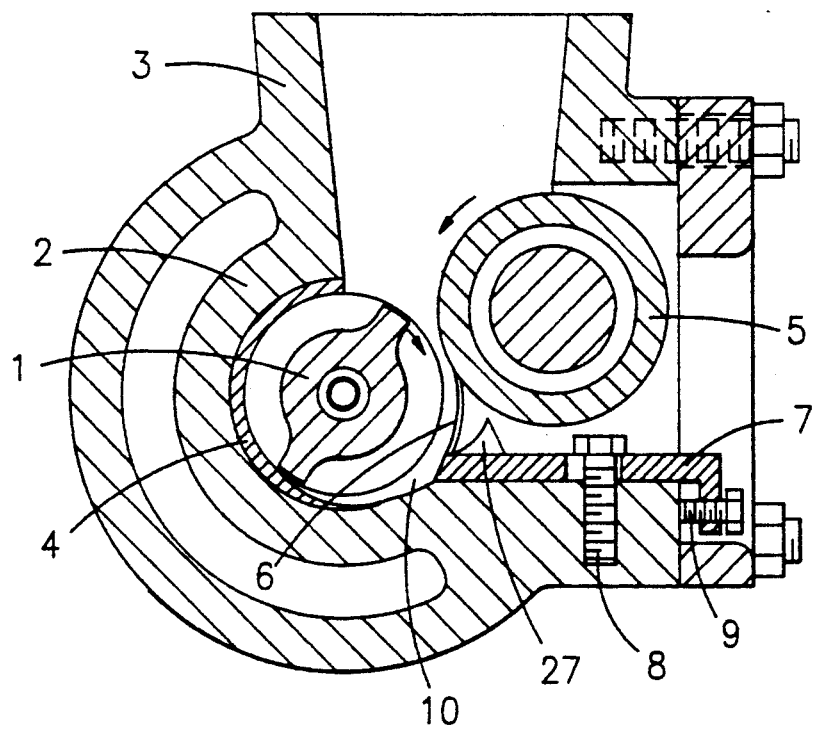
FIG. 6 is a schematic cross sectional view of another embodiment of the invention in which there is provided means for limiting the flexing of a flexible scraping blade under heavy loading.

In the embodiment shown in FIG. 6, the cylindrically dished curved scraping blade 6 is so formed that, under heavy loading by pressure of material in the pocket 10 against the front side face of the blade, the back side face of the blade can be pressed against support cams 27 on the knife holder 7, which prevent excessive bending of the scraping knife 6.

Figure 7:
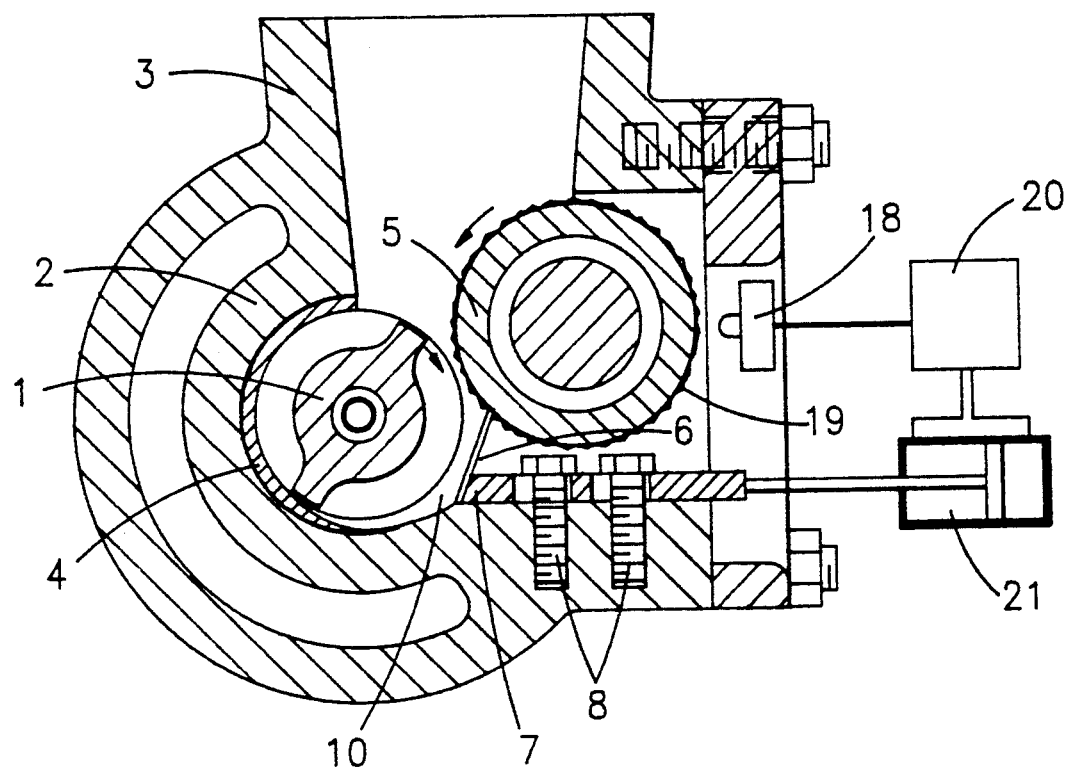
FIG. 7 is a schematic cross sectional view of another embodiment of the invention in which there is provided means for automatically controlling the pressure on the scraping knife.

In FIG. 7, there is shown a sensor controlled embodiment in accordance with the invention. Through a sensor 18, which may be a photocell, it is determined whether a skin of material 19 has built up on the feed roller 5. If this is the case, through the help of a control device 20, a pressure medium is supplied to a hydraulic or pneumatic servo-motor 21, which is formed as a cylinder-piston unit, and which, by means of a slidable knife holder 7, draws the flexible spring scraping knife 6 stronger against the circumferential surface of the feed roller 5. This results in an increased scraping of the skin 19 from the circumferential surface of the feed roller.

The representation of the deflection of the spring knife 6 in FIG. 5 is greatly exaggerated. Also in FIG. 6 the permitted deflection of the knife 6 is greatly exaggerated, the distance between the knife 6 and the support cams 27 is normally much smaller than is shown in FIG. 6.

What I claim is:

1. A screw extruder comprising a housing,
    a screw rotatable in said housing,
    a feed roller rotatable in said housing, said feed roller being parallel to and spaced laterally from said screw,
    said housing comprising a feed hopper for feeding material downwardly to said screw and said feed roller and to a space between said screw and said feed roller, and
    scraping means for scraping material from said feed roller, said scraping means comprising a knife which comprises a thin flexible spring blade having a back edge portion, a knife edge, a front side face and a back side face, a knife holder for supporting said knife by said back edge portion of said spring blade, said knife holder being disposed below said feed roller and said knife extending upwardly from said knife holder with said knife edge in engagement with said feed roller on a side thereof facing said screw and with said front side face of said thin flexible spring blade exposed to material in said space between said feed roller and said screw for deflecting said thin flexible spring blade relative to said knife holder, in a direction toward said feed roller, by pressure of material in said space so as to press said knife edge of said thin flexible spring blade against said roller with greater force when pressure of material in said space is greater, and
    deflection limiting means for permitting limited deflection of said flexible spring blade by said pressure of said material in said space, said deflection limiting means comprising a cam surface on said knife holder, said cam surface being spaced from said back side face of said spring blade when said blade is undeflected and being engageable by said back side face of said blade when said blade is deflected a predetermined amount so as to limit deflection of said blade.

2. A screw extruder according to claim 1, in which said knife holder is movable in a direction to press said knife edge against said feed roller and in which means is provided for securing said knife holder in selected position.

3. A screw extruder according to claim 1, in which said housing has a surface below said feed roller and in which said knife holder comprises a plate lying on said surface of said housing below said feed roller, and
    said back edge portion of said spring blade is fixedly secured to said plate.

4. A screw extruder according to claim 3, in which said plate has an upper surface and in which said deflection limiting means comprises a protuberance on said upper surface of said plate, said protuberance being of a size, shape and location to permit limited deflection of said spring blade by pressure of material in said space between said screw and said feed roller.

5. A screw extruder according to claim 3, in which said plate has a slotted hole and is secured to said surface by a screw extending through said slotted hole in said plate, said hole being elongated in a direction permitting movement of said plate to press said knife edge against said feed roller.

6. A screw extruder according to claim 3, further comprising pressure varying means for moving said plate in a direction to vary pressure of said knife edge on said feed roller.

7. A screw extruder according to claim 6, in which said plate has a down-turned flange and a tapped hole in said down-turned flange and in which said pressure varying means comprises a screw screwed through said tapped hole in said down-turned flange of said plate and engaging a portion of said housing.

8. A screw extruder comprising a housing, a screw rotatable in said housing, a feed roller rotatable in said housing, said feed roller being parallel to and spaced laterally form said screw,
    said housing comprising a feed hopper of directing material downwardly to said screw and said feed roller and to a space between said screw and said feed roller, and means for scraping material from said feed roller, 'said scraping means comprising a thin elongated flexible knife blade having a lower back edge, an upper knife edge and a side face
    knife supporting means disposed below said feed roller for movably supporting said knife blade by its lower back edge in a position in which said knife blade extends up form said knife supporting means with its upper knife edge bearing on said feed roller on a side thereof facing said screw and with said side face of said knife blade exposed to material in said space between sad feed roller and said screw for deflection of said knife blade relative to said knife supporting means, in a direction toward said feed roller, by pressure of material in said space so as to press said knife edge against said feed roller with greater force when pressure of said material in said space is greater, and means for limiting deflection of said knife blade by said pressure of said material in said space, said knife supporting means comprising a plate mounted on said housing and having an upper surface, and said means for limiting deflection of said knife blade comprising a protuberance on said upper surface of said plate, said protuberance being spaced form said blade when said blade is undeflected and being of a size, shape and location to permit only limited flexing of said blade by pressure of said material in said space between said feed roller and said screw.

* * * * *